United States Patent
Min et al.

(10) Patent No.: US 10,641,309 B2
(45) Date of Patent: May 5, 2020

(54) AIR BAG APPARATUS

(71) Applicant: Hyundai Mobis Co., Ltd., Seoul (KR)

(72) Inventors: Byung Ho Min, Seoul (KR); Sang Won Hwangbo, Goyang-si (KR); Seok Hoon Ko, Yongin-si (KR); Hae Kwon Park, Yongin-si (KR); Kyu Sang Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 111 days.

(21) Appl. No.: 16/142,048

(22) Filed: Sep. 26, 2018

(65) Prior Publication Data

US 2019/0101148 A1    Apr. 4, 2019

(30) Foreign Application Priority Data

Sep. 29, 2017   (KR) .................. 10-2017-0127038

(51) Int. Cl.
  *F16B 21/10*   (2006.01)
  *B60R 21/213*  (2011.01)
  *B60R 21/214*  (2011.01)
  *B60R 21/16*   (2006.01)

(52) U.S. Cl.
  CPC ............ *F16B 21/10* (2013.01); *B60R 21/213* (2013.01); *B60R 21/214* (2013.01); *B60R 2021/161* (2013.01)

(58) Field of Classification Search
  CPC ..... F16B 21/10; B60R 21/214; B60R 21/213; B60R 2021/161
  See application file for complete search history.

(56) References Cited

U.S. PATENT DOCUMENTS

| | | | |
|---|---|---|---|
| 7,125,037 B2* | 10/2006 | Tallerico | B60R 21/231 280/728.2 |
| 7,328,911 B2* | 2/2008 | Chapman | B60R 21/20 280/728.2 |
| 9,487,175 B2* | 11/2016 | Noma | B60R 21/201 |
| 2004/0232663 A1* | 11/2004 | Takimoto | B60R 21/2338 280/730.1 |
| 2005/0087960 A1* | 4/2005 | Gammill | B60R 21/232 280/728.2 |
| 2011/0248484 A1* | 10/2011 | Scott | B60R 21/213 280/730.2 |
| 2013/0257026 A1* | 10/2013 | Konishi | B60R 21/213 280/728.2 |
| 2019/0210555 A1* | 7/2019 | Koo | B60R 21/213 |

* cited by examiner

*Primary Examiner* — Darlene P Condra
(74) *Attorney, Agent, or Firm* — H.C. Park & Associates, PLC

(57) ABSTRACT

An airbag apparatus may include: a guide bar; a plurality of holders contacting the outer surface of the guide bar, and supporting the guide bar; a plurality of guide tabs connected to the respective holders, surrounding the guide bar; and a cushion connected to the holders on the opposite side of the guide taps.

9 Claims, 4 Drawing Sheets

AIR BAG APPARATUS

CROSS-REFERENCE TO RELATED APPLICATION

This application claims priority from and the benefit of Korean Patent Application No. 10-2017-0127038, filed on Sep. 29, 2017, which is hereby incorporated by reference for all purposes as if fully set forth herein.

BACKGROUND

Field

Exemplary embodiments relate to an airbag apparatus, and more particularly, to an airbag apparatus capable of reducing noise generated between parts thereof.

Discussion of the Background

An airbag apparatus for a vehicle refers to a safety device that reduces a shock applied to a passenger by deploying an airbag cushion in case of a collision accident. Examples of the airbag apparatus may include a DAB (Driver Air Bag), PAB (Passenger Air Bag), SAB (Side Air Bag), CAB (Curtain Air-Bag), KAB (Knee Air Bag) and RAB (Roof Air Bag).

The RAB according to the related art has a structure in which a guide tab is coupled to a fabric tab of a cushion and the folded cushion is fastened to a deployment guide by the guide tab. In case of a vehicle collision, the guide tab deploys the deployment guide.

In such a structure according to the related art, the deployment guide and the guide tab include a metallic material. Thus, noise may be generated by contact between the deployment guide and the guide tab, which is caused by vibration of the vehicle when the vehicle stops or drives. Therefore, there is a demand for a structure capable of solving the problem.

The above information disclosed in this Background section is only for enhancement of understanding of the background of the invention and, therefore, it may contain information that does not constitute prior art.

SUMMARY

Exemplary embodiments of the present invention provide an airbag apparatus capable of reducing noise generated between parts thereof.

In one embodiment, an airbag apparatus may include: a guide bar; a plurality of holders contacting the outer surface of the guide bar, and supporting the guide bar; a plurality of guide tabs connected to the respective holders, surrounding the guide bar; and a cushion connected to the holders on the opposite side of the guide taps.

Each of the holders may include: a holder body holding the guide bar therein; and fixing protrusions formed at the holder body, coming in contact with the guide bar, and supporting the guide bar held in the holder body.

The plurality of holders may be formed in the longitudinal direction of the guide bar, the holder body may have a coupling protrusion formed at one surface thereof and a protrusion seating groove formed at the other surface thereof, the protrusion seating groove corresponding to the coupling protrusion, and the plurality of holder bodies may be coupled to one another through the coupling protrusions and the protrusion seating grooves which are fastened to each other.

The pair of fixing protrusions may be arranged to face each other, the shortest distance between the fixing protrusions may be set to a smaller value than the diameter of the guide bar.

The fixing protrusions may be formed of an elastically deformable material.

The fixing protrusions may include a rounded portion abuts the guide bar.

The holder may be formed of an elastically deformable material.

The holder may have a guide part around which a cushion winding part of the cushion is wound.

The guide tab may be formed in a U-shape, and both ends of the U-shaped guide tab may be connected to the holder.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
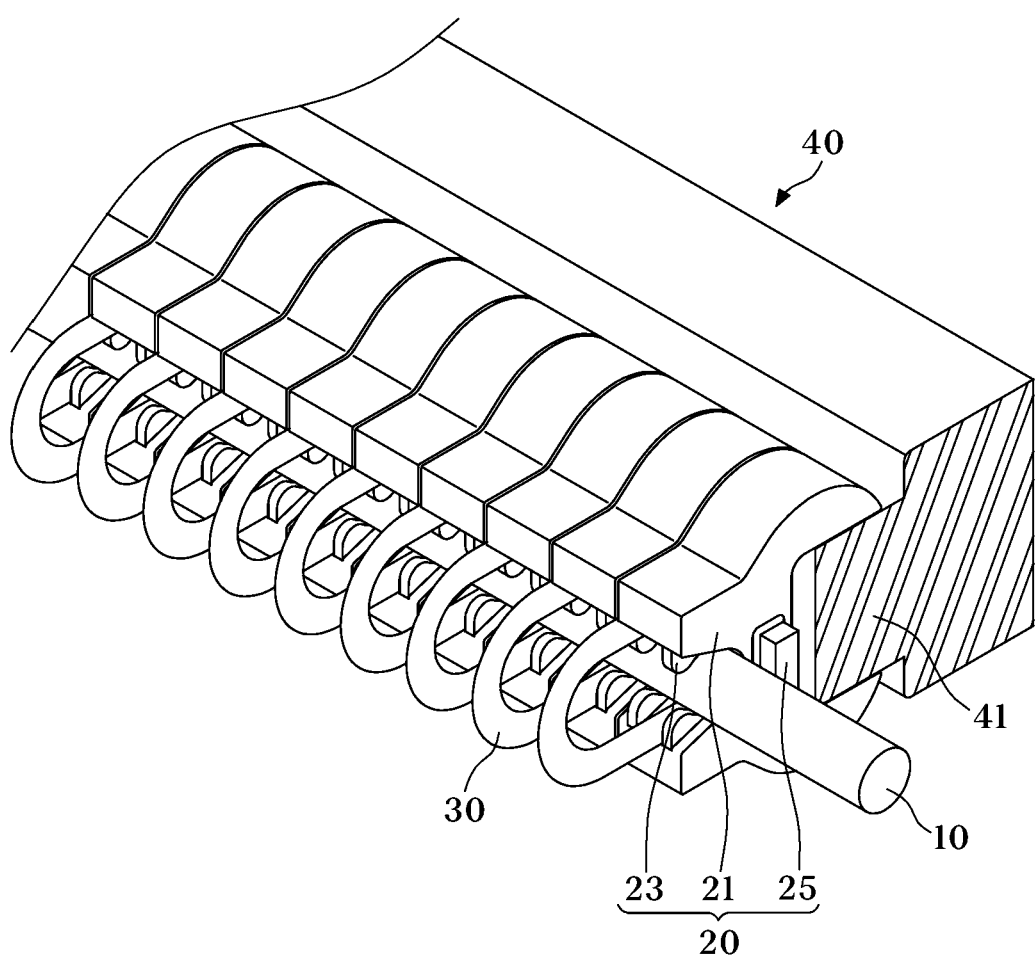
FIG. 1 is a perspective view schematically illustrating an airbag apparatus in accordance with an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereafter, an airbag apparatus in accordance with an embodiment of the present invention will be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 2:
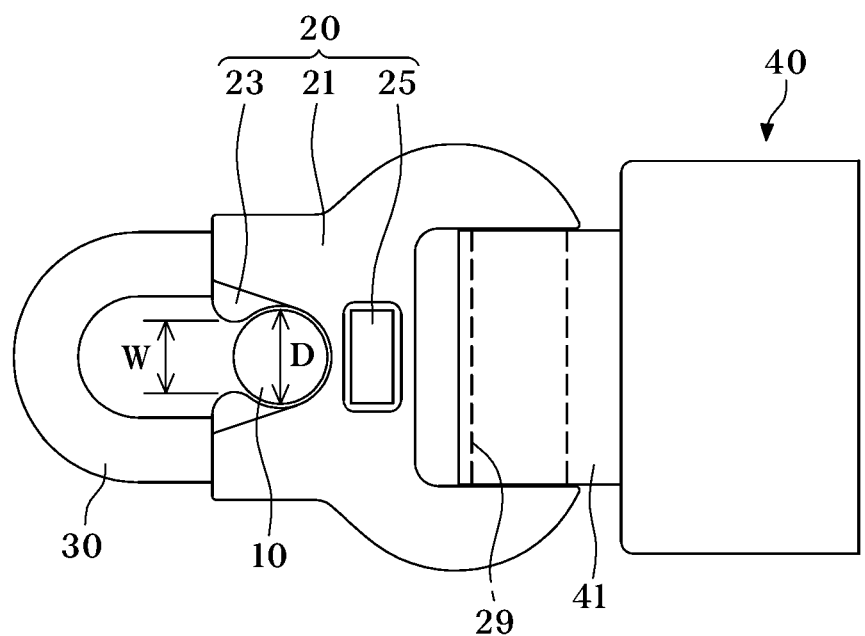
FIG. 2 is a side view schematically illustrating the airbag apparatus in accordance with the embodiment of the present invention.
Figure 3A:
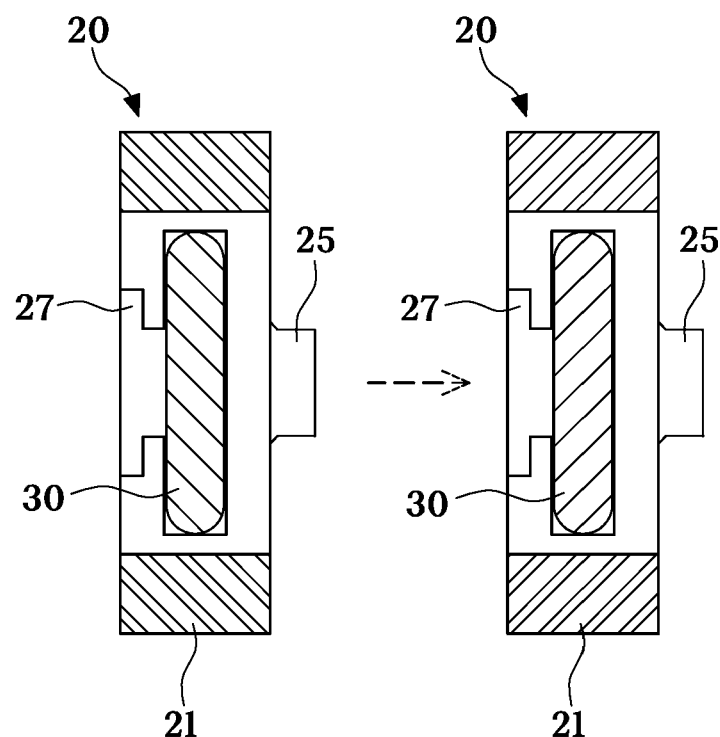
FIGS. 3A and 3B are front views schematically illustrating the coupling relation between holders in the airbag apparatus in accordance with the embodiment of the present invention.
Figure 3B:
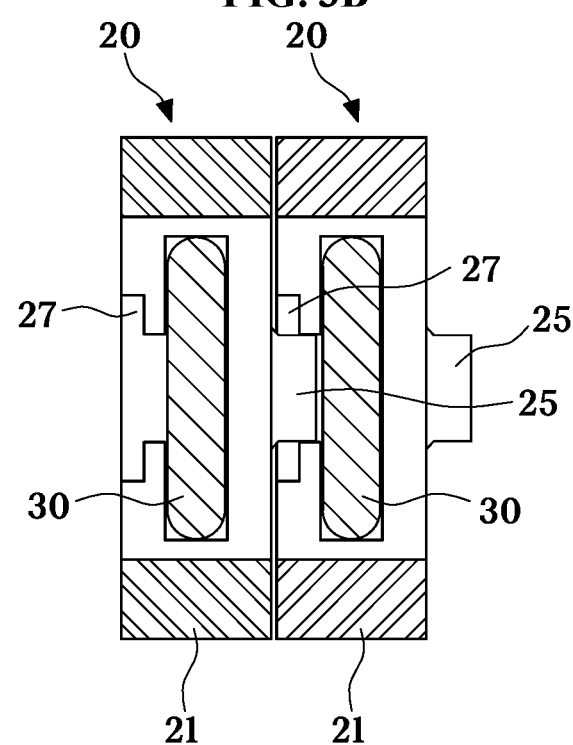
Figure 4:
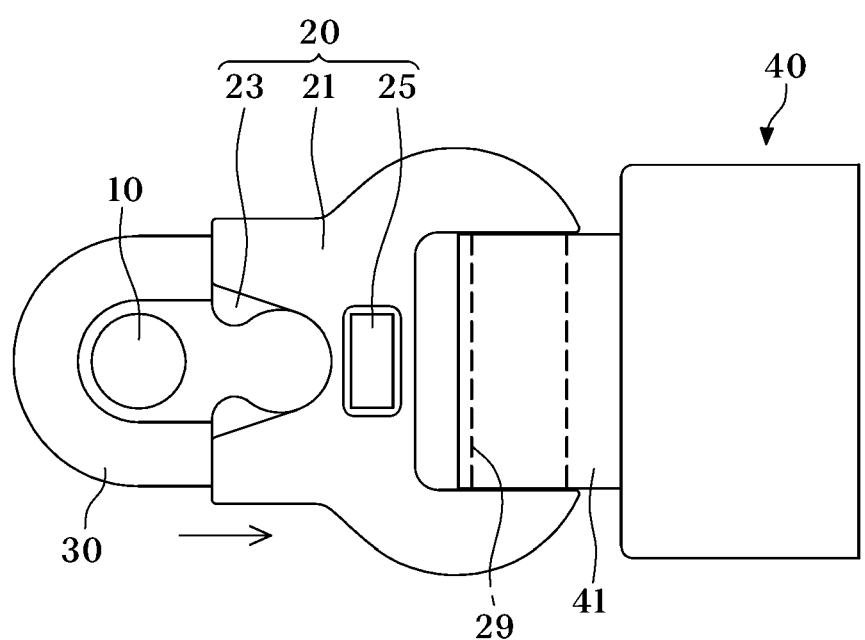
FIG. 4 is a side view schematically illustrating the operation of the airbag apparatus in accordance with the embodiment of the present invention.

FIG. 1 is a perspective view schematically illustrating an airbag apparatus in accordance with an embodiment of the present invention, FIG. 2 is a side view schematically illustrating the airbag apparatus in accordance with the embodiment of the present invention, FIGS. 3A and 3B are front views schematically illustrating the coupling relation between holders in the airbag apparatus in accordance with the embodiment of the present invention, and FIG. 4 is a side view schematically illustrating the operation of the airbag apparatus in accordance with the embodiment of the present invention.

Referring to FIGS. 1 and 2, the airbag apparatus in accordance with the embodiment of the present invention may include a guide bar 10, a plurality of holders 20, a plurality of guide tabs 30 and a cushion 40. The guide bar 10 may be installed so as to be fixed to the roof (not illustrated) of a vehicle. The guide bar 10 may be formed in an elongated rod shape along the widthwise direction or longitudinal direction of the vehicle.

The holder 20 may cover the outer surface of the guide bar 10, and support the guide bar 10 such that the guide bar 10 does not separate. The holder 20 may support the guide bar 10 so as not to move in the space between the holder 20 and the guide tab 30 when the cushion 40 is not deployed, thereby preventing generation of noise between guide bar 10 and the guide tab 30.

The holder 20 may include a holder body 21 and fixing protrusions 23. The holder body 21 may have an opened portion at one side (left side based on FIG. 2) thereof, in order to hold the guide bar 10 therein. The fixing protrusions 23 may be formed at one side and the other side of the opened portion of the holder body 21 (top and bottom sides based on FIG. 2). The pair of fixing protrusions 23 are arranged to face each other. The fixing protrusions 23 may come in contact with the guide bar 10, and fix the guide bar 10 held in the holder body 21. The fixing protrusions 23 are formed to be rounded. The rounded portion of the fixing protrusions 23 abuts the guide bar 10.

The shortest distance W between the fixing protrusions 23 formed at the top and bottom of the holder body 21 may be set to a smaller value than the diameter D of the guide bar 10. Since the shortest distance W between the fixing protrusions 23 is smaller than the diameter D of the guide bar 10, the guide bar 10 held in the holder body 21 can be caught by the fixing protrusions 23, and thus prevented from separating from the holder body 21. At the other side of the holder 20 (right side based on FIG. 2), a guide part 29 may be formed. A cushion winding part 41 of the cushion 40 may be wound around the guide part 29 so as to fix the cushion 40.

Referring to FIGS. 1 and 3, the plurality of holders 20 may be formed in the longitudinal direction of the guide bar 10 so as to overlap one another. Each of the holder bodies 21 may have a coupling protrusion 25 formed at one surface thereof (right surface based on FIG. 3) and a protrusion seating groove 27 formed at the other surface thereof (left surface based on FIG. 3). The protrusion seating groove 27 may have a size and shape corresponding to those of the coupling protrusion 25. The plurality of holder bodies 21 may be coupled to one another, while the coupling protrusions 25 are fastened to the corresponding protrusion seating grooves 27. Since the plurality of holder bodies 21 are coupled to one another along the longitudinal direction of the guide bar 10 while the coupling protrusions 25 and the protrusion seating grooves 27 are fastened to each other, the cushion 40 connected to the holder bodies 21 can be prevented from losing its shape, and maintained in good shape.

The holder 20 including the holder body 21, the fixing protrusions 23, the coupling protrusion 25, the protrusion seating groove 27 and the guide part 29 may be formed of an elastically deformable material.

Since the holder 20 is formed of an elastically deformable material, the guide bar 10 held in the holder body 21 may be supported. At normal times, a separation of the guide bar 10 can be prevented by the fixing protrusions 23. In case of a vehicle collision, the holder 20 may be moved in one direction (right side based on FIG. 4), and the guide bar 10 may be separated from the elastically deformed fixing protrusions 23. The holder 20 may be formed through rubber injection molding. In the present embodiment, examples of the elastically deformable material of the holder 20 may include rubber, silicone and the like.

The guide tab 30 may be formed in a U-shape, and both ends of the U-shaped structure may be connected to the holder 20. The guide tab 30 covers the guide bar 10 in a non-contact state at normal times. The holder 20 and the guide tab 30 may be moved in the longitudinal direction of the guide bar 10 at the time of a vehicle collision. Simultaneously or sequentially the holder 20 may be moved in a direction perpendicular to the longitudinal direction of the guide bar 10 (right direction based on FIG. 4), in case of a vehicle collision. With the movement of the holder 20, the cushion 40 may be deployed toward a passenger, in order to protect the passenger.

The cushion 40 may be connected to the holder 20. In case of a vehicle collision, the cushion 40 may be deployed toward the passenger by the movement of the holder 20 and the guide tab 30, thereby protecting the passenger. The cushion winding part 41 at one side of the cushion 40 (left side based on FIG. 2) may be wound around the guide part 29 of the holder 20, such that the cushion 40 is fixed to the holder 20.

Referring to FIGS. 2 and 4, the operation of the airbag apparatus in accordance with the embodiment of the present invention will be described. Referring to FIG. 2, the guide bar 10 may be held in the holder body 21 of the holder 20 and restricted from separating from the fixing protrusion 23. Although vibration of the vehicle occurs, the guide bar 10 can be stably supported by the holder 20 formed of an elastically deformable material, and generation of noise by a collision with the holder 20 can be prevented.

Referring to FIG. 4, since the guide bar 10 is fixed to the roof of the vehicle in case of a vehicle collision, the holder 20 may be moved in one direction (right side based on FIG. 4), and the cushion 40 connected to the holder 20 may be moved to the right. At this time, while the fixing protrusions 23 are elastically deformed, the guide bar 10 may be separated from the holder body 21 of the holder 20.

The airbag apparatus in accordance with the embodiment of the present invention can prevent generation of noise between the holder 20 and the guide bar 10, thereby improving ride comfort.

Furthermore, since the plurality of holders 20 supporting the guide bar 10 are coupled through the coupling protrusions 25 and the protrusion seating grooves 27 which are fastened to each other, the cushion 40 connected to the holders 20 can be prevented from being twisted.

Furthermore, the cushion 40 can be uniformly deployed toward the passenger.

Although exemplary embodiments of the present disclosure have been shown and described hereinabove, the present disclosure is not limited to specific exemplary embodiments described above, but may be various modified by those skilled in the art to which the present disclosure pertains without departing from the scope and spirit of the disclosure as disclosed in the accompanying claims. In addition, such modifications should also be understood to fall within the scope and spirit of the present disclosure.

What is claimed is:

1. An airbag apparatus comprising:
   a guide bar;
   a plurality of holders contacting an outer surface of the guide bar, and configured to support the guide bar;
   a plurality of guide tabs connected to the respective plurality of holders, surrounding the guide bar; and
   a cushion connected to the plurality of holders on an opposite side of the guide tabs.

2. The airbag apparatus of claim 1, wherein each of the plurality of holders comprises:
   a holder body holding the guide bar therein; and
   a pair of fixing protrusions formed on the holder body, contacting the guide bar, and configured to hold the guide bar in the holder body.

3. The airbag apparatus of claim 2, wherein the plurality of holders are formed in a longitudinal direction of the guide bar,
   the holder body comprises a coupling protrusion formed at one surface of the holder body and a protrusion seating groove formed at another surface of the holder body, the protrusion seating groove corresponding to the coupling protrusion in the longitudinal direction of the guide bar, and
   the holder body is fastened to two neighboring ones of the plurality of holder bodies through the coupling protrusion coupled with the protrusion seating groove on one of the two neighboring ones of the plurality of holder bodies, and the protrusion seating groove coupled with the coupling protrusion on another of the two neighboring ones of the plurality of holder bodies.

4. The airbag apparatus of claim 2, wherein the pair of fixing protrusions are arranged to face each other, a shortest distance between the pair of fixing protrusions is set to a value smaller than a diameter of the guide bar.

5. The airbag apparatus of claim 4, wherein the pair of fixing protrusions are formed of an elastically deformable material.

6. The airbag apparatus of claim 2, wherein the fixing protrusions comprise a rounded portion contacting the guide bar.

7. The airbag apparatus of claim 1, wherein the plurality of holders are formed of an elastically deformable material.

8. The airbag apparatus of claim 1, wherein each of the plurality of holders comprises a guide part around which a cushion winding part of the cushion is fixed on.

9. The airbag apparatus of claim 1, wherein the plurality of guide tabs are formed in a U-shape, and both ends of each of the plurality of guide tabs are connected to each of the plurality of holders.

* * * * *